Oct. 2, 1945.  M. WATTER  2,386,018
METHOD OF MAKING AIRCRAFT STRUCTURES
Filed March 8, 1941
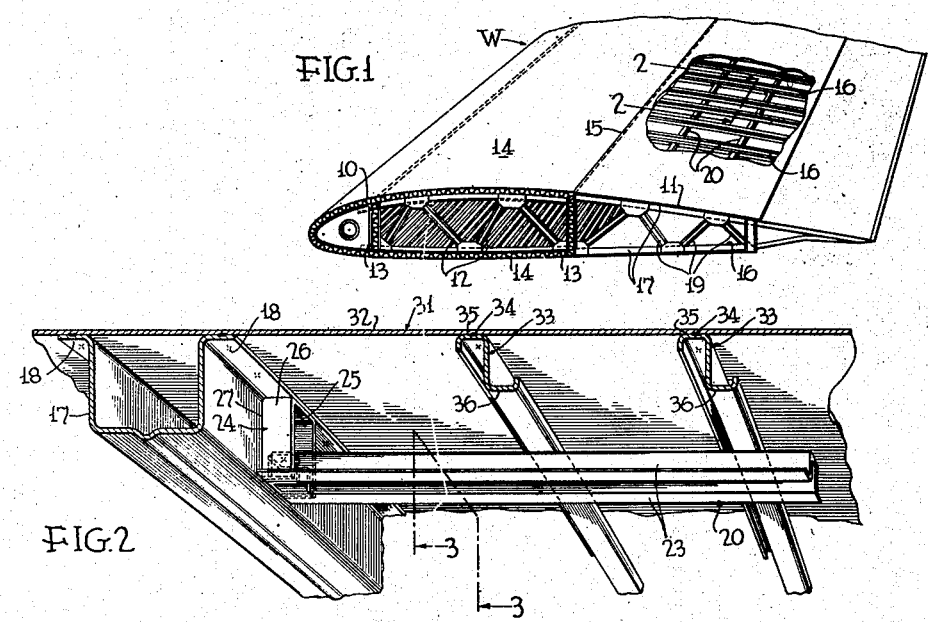
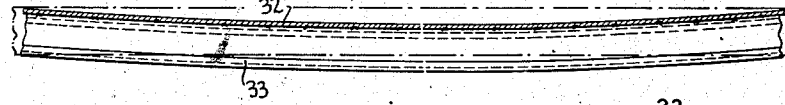
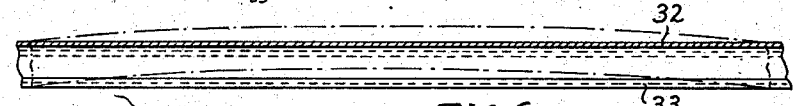
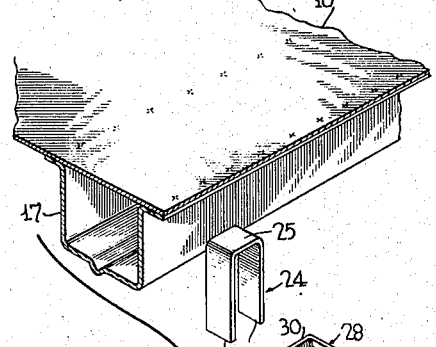
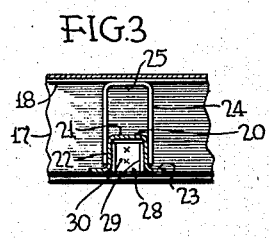
INVENTOR
Michael Watter
BY John P. Taebox
ATTORNEY Patented Oct. 2, 1945

2,386,018

UNITED STATES PATENT OFFICE 2,386,018

METHOD OF MAKING AIRCRAFT STRUCTURES

Michael Watter, Philadelphia, Pa., assignor to Edward G. Budd Manufacturing Company, Philadelphia, Pa., a corporation of Pennsylvania Application March 8, 1941, Serial No. 382,331

4 Claims. (Cl. 29—148.2)

The present invention is a continuation-in-part of the invention disclosed in my copending application Ser. No. 285,359, filed July 19, 1939, and relates to aircraft, more particularly to a skin-supporting structure for airplane wings and the like, and to a new and improved method of attaching a skin blanket to the wing structure.

Airplane wings of the cantilever stressed skin type generally comprise a series of spaced substantially parallel fore- and aft-extending ribs having the contour of the airfoil, a skin extending about the rib chords, and transverse shear webs and truss structure for spacing and supporting the ribs. The skin employed for wings of the foregoing character usually is constructed of sheets of relatively thin, durable metal, such as, for example, stainless steel.

Considerable difficulty has been encountered in the past in providing the metal sheets with a smooth, even surface. In cases where the skin is attached by spot welding, the heat produced during the welding operation upsets the metal, and the subsequent cooling of the thin metal creates a contraction stress around each weld which causes the skin to wrinkle or buckle along the line of welds. This condition also occurs when the attachment is made by means of flush rivets. In this case, dimpling of the skin sheets is necessitated, and this likewise results in the creation of contraction stresses around the dimples. Because of the necessary mechanical work, the skin sheets, like in the case of spot welding, when secured, have a buckled, uneven, wavy appearance.

The resulting skins are objectionable because the small bulges and wrinkles increase the resistance to airflow. Moreover, on close inspection, the skins give the appearance of poor workmanship. Heavier sheets than otherwise necessary have been employed in order that the stiffness of the sheet itself might tend to reduce the unevenness. Also, thin skin sheets backed by corrugated metal sheets have been used in order to produce the required stiffness, but the frequently spaced spot welds necessary to secure the skin sheets and corrugated backing together increases the internal stresses and the unevenness produced by the engagement of the individual corrugations with the skin sheets, together with the combined weight of the skin and backing, is disadvantageous.

The present invention aims to overcome the foregoing difficulties and objection by providing a new and improved method of attaching a thin skin sheet of stainless steel or other suitable material to the framing of an aircraft wing or other device by means of which wrinkles and bulges are eliminated or minimized, and also by providing a skin blanket comprising thin metal skin sheets and a plurality of relatively light supporting strips or former secured to the inner surfaces of the sheets which not only increase the stiffness of the sheets and minimize the deflections of the sheets under load, but also which are attachable to the wing structure in such manner as to minimize the creation of the heretofore-mentioned buckling and unevenness. The invention further aims to provide a plurality of transversely extending supports for the formers which are adapted to be positioned between adjacent ribs and attached thereto in such manner that they assist in tensioning the skin sheet.

One of the objects of the present invention is to provide a new and improved method of assembling a skin blanket to a wing structure wherein, by reason thereof, objectionable buckling, wrinkling and the like is minimized.

Another object of the present invention is to provide a skin-supporting structure for minimizing wrinkling or buckling of the skin sheets and which is adapted to impart a smooth, even, external appearance to the skin sheets.

Another object of the invention is to provide a skin-supporting structure which is simple and economical in construction and which facilitates assembly of the wing structure and attachment of skin sheets of high tensile strength stainless steel, or other high strength material, and by means of which spot welding may be employed as the securing means.

A further object of the invention is to provide a skin-supporting structure which greatly stiffens the skin sheets and yet is relatively light in weight and consequently does not substantially increase the weight of the wing structure.

Other and further objects of the invention will be obvious upon an understanding of the illustrated embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein Fig. 1 is a fragmentary perspective view of an airplane wing of the cantilever type to which the present invention may be applied;

Fig. 2 is a perspective view looking upwardly at a skin-supporting structure in section substantially along the line 2—2 on Fig. 1, illustrating an embodiment of the invention;

Fig. 3 is a cross-sectional view as indicated on Fig. 2 by the arrows 3—3;

Fig. 4 is an exploded perspective view of an arrangement for securing a strip-supporting member to a rib chord;

Fig. 5 is a fragmentary transverse sectional view through the skin sheet in curved formation in solid lines, and in straightened condition in dotted lines, showing one of the stiffening formers secured thereto; and Fig. 6 is a similar view showing, in solid lines, the skin sheet as applied to straight stiffening elements and, in dotted lines, the same after bending to curved shape.

Referring to the accompanying drawing in which like numerals refer to like parts throughout the several views, the wing W, as shown in Fig. 1, comprises a leading or forward section 10 which almost entirely carries the load caused by air pressure and vacuum, and a trailing or rearward section 11, which in effect is largely a means for streamlining the leading section.

The leading section 10 is shown, for the purpose of illustration, as comprised of fore- and aft-extending primary ribs 12, longitudinally extending spars 13 of suitable design interconnecting the ribs 12 and suitably reinforced top and bottom skin blankets 14 which terminate approximately at the rearward spar 13, as indicated at 15 in Fig. 1.

The present invention in this case is illustrated in connection with the trailing section of the wing. However, it is to be understood that it is not to be considered as limited to this particular section of an aircraft wing, nor, for that matter, to any particular section of an air-craft wing, because it is equally as adaptable to other parts of aircraft and to other devices having thin skin coverings and wherein similar problems are encountered.

The trailing section 11 in the illustration shown in the drawing embodies a plurality of spaced trailing ribs 16, which, depending upon the particular design of the leading section 10, may form an integral part of the primary ribs 12, be secured to the trailing ends thereof, or be suitably secured to the rearward spar 13.

The trailing ribs 16, as here shown for the purpose of illustration, may comprise upper and lower chord elements 17, each channel-shaped in cross-section and having marginal, laterally extending flanges 18. The upper and lower chords are interconnected and held in spaced relation by angularly extending braces or trusses 19. The invention is not confined to any particular construction of trailing rib, it only being essential that such ribs have the desired strength and rigidity.

Referring to Figs. 2 and 3 and as shown in Fig. 1, a plurality of skin blanket supporting elements 20 extend spanwise between each pair of trailing ribs 16. Each element 20 is preferably channel-shaped in cross-section, it having a base 21 and substantially parallel legs 22, each of which terminates in a marginal laterally extending flange 23.

In the completely assembled structure, the supporting elements 20 are rigidly secured at their ends to the adjacent trailing ribs 16. Various attaching means may be employed. One means which has been found to be satisfactory is shown in the drawing to comprise a U-shaped bracket 24 having its base 25 spot welded to the flange 18 of chord 17 with its legs 26 firmly engaging the side wall of the chord, as shown at 27 in Fig. 2.

A second U-shaped bracket 28 is disposed within the bracket 24, as shown in Fig. 3, with its legs 29 extending at right angles to the legs 26 of bracket 24 in spaced relation and with its base 30 spot welded to the side wall of the chord 17.

The end of the supporting element 20 is fitted between the legs 26 of bracket 24 and with the legs 29 of bracket 28 engaging the inner sides of the legs 22. Referring to Fig. 3, it will be seen that each leg 22 of the supporting element 20 is closely confined between legs 26 and 29 of the brackets 24 and 28, respectively. These legs, namely, 22, 24 and 28, at each side of the longitudinal vertical plane of the supporting element 20 are securely welded together, thus providing a reinforced rigid end structure for the supporting element 20.

The present invention contemplates that, prior to the assembly of the skin blanket 31 for the trailing section 11, only one end of each supporting element 20 will be secured to the attaching brackets 24 and 28 in the manner just described. The attaching of the other end to its brackets 24 and 28, or, in some instances, the attaching of both ends, is left until after the performance of another assembly operation about to be described. In other applications of the invention, both ends of the elements 20 are secured to their respective brackets prior to the assembly of the skin blanket 32.

The skin blanket 31 comprises a skin sheet 32 of the desired metal and a plurality of spaced skin-stiffening elements or formers 33 extending chordwise between adjacent trailing ribs 16. The formers 33, which preferably are welded to the skin sheets, as indicated at 34, may be in the form of relatively light Z-shaped members conforming to the desired airfoil contour and are of suitable stiffness to prevent deflection of the skin sheet 32. The Z-shaped formers 33 are provided with parallel oppositely extending flanges 35 and 36, flange 35 constituting the skin-attaching flange, and flange 36 constituting an abutment flange for engagement with the supporting element 20, as shown in Fig. 2. Other structural shapes, however, for the stiffening elements may be employed.

Prior to attaching the skin sheet 32 to the stiffening elements 33, the stiffening elements, in one application of the present invention, are bent to concavo-convex shape so that, as shown in Fig. 5, the skin-attaching flanges 35 present concave surfaces and the flanges 36 thereof present convex surfaces.

The skin 32 is then flexed to have continuous engagement with the concave surfaces of the stiffening elements 33 and then secured at spaced intervals, preferably by spot welding, to the attaching flanges 35 throughout the longitudinal extent thereof. Rivets, however, may be employed, if desired.

Assuming, first, that the supporting elements 20 have been secured to their respective supporting brackets, the assembled skin blanket is disposed upon the wing structure with the flanges 36 of the stiffening elements 33 engaging the supporting elements 20. Then, by the application of pressure by any suitable means, the stiffening elements 33 are bent from their concavo-convex form to the aerofoil contour and secured at their ends to the wing structure in any suitable manner, the skin also being secured as desired to the ribs and to other structural parts of the wing framing. It is to be understood, of course, that the supporting elements 20 are of such strength as to withstand, without appreciable deformation, the pressures exerted by the application of the bending pressure to the stiffening elements 33.

Due to the bending of the stiffening elements 33 from their concavo-convex form, it is obvious that the flanges 35 are subjected to tension stresses. This causes an elongation of the flanges 35 which increases the distance between each pair of adjacent regions of securement, the skin 32 between such regions stretching and being placed under tension. The tensioning of the skin in this manner between the regions of securement tends to smooth out the wrinkling or bulges which occurred during the welding operation in the case of spot welding, or the dimpling operation in the case where flush rivets are used.

If desired, the skin blanket 31, prior to the bending of the elements 33 from their concavo-convex shape, first, may be secured in place along one edge, such as, for example, along edge 15, as viewed in Fig. 1.

In another application of the invention, one or both ends of the supporting elements 20 may be left unsecured and, while backing up the skin blanket 31 in any suitable manner and holding the ends of the stiffening elements 33 against movement laterally of the skin, the stiffening elements 33 may be bent from their concavo-convex shape to the desired aerofoil contour by exerting pressure through the medium of the supporting elements 20, after which the elements 20 may be secured to their respective supporting brackets and the securing of the skin 32 to the other desired framing parts completed.

In either case, the flanges 36 of the stiffening elements 33 may, if desired, be secured to the supporting elements 20, by welding or any other suitable method.

In another application of the invention, such as, for example (Fig. 6), when the stiffening elements 33 are to have a rounded or curved contour, as when employed as stiffeners for the nose or wing tip portion of the wing, or for a fuselage, the skin sheet 32 and elements 33 may be secured together in the flat and, subsequently, bent to concavo-convex contour such as to tension the skin-attaching flanges 35, and, consequently, the skin portions disposed between the regions of securement in the manner previously described.

It is to be clearly understood that the tensioning of the skin between regions of securement to the stiffening member may be performed either when the engaging surface of the stiffening element is flat or of concave contour, the controlling factor, of course, being the particular contour the skin blanket is to have in the completed structure.

From the foregoing description, it will be seen that the present invention provides an improved skin-supporting structure for aircraft constructions, and a new and improved method of attaching a skin sheet or blanket to metal framing. The structure has a high tensile strength and is adapted to resist longitudinal and transverse bending stresses, but yet is relatively light in weight. A minimum number of parts are utilized which enables the structure to be readily assembled in an economical manner, and the parts of the structure are arranged to facilitate welding them in a minimum amount of time. The skin sheets, when secured in accordance with the method described, are relatively smooth and free from wrinkles and bulges. The structure is rugged and can withstand any rough usage to which it may be subjected. Where the ribs 16 are spaced approximately eight to ten inches, three stiffening strips or formers 33 may be arranged parallel to and uniformly spaced therebetween, and the former-supporting elements 20 may be arranged at such spacing as may be advantageous, as for example every ten inches. With this arrangement, a thin skin sheet is rendered stiff with a minimum of rigidifying structure, as well as a minimum number of spot welds, and the entire structure can be fabricated by spot welding, the skin sheet and former elements being assembled to the frame as a subassembly.

While the present invention has been shown and described in connection with the skin blanket for the upper side of the trailing section of the wing, it is to be understood that the same applies as well to the skin blanket for the lower side of this section, and to other structures in which a skin sheet is applicable.

In the appended claims, the terms "distending" and "deformed," where used, are to be construed as meaning any action upon the elements secured to the skin sheet, whether it be by bending or the application of any other force, which tends to elongate that portion of the metal of the elements engaged with the skin sheet.

As various changes may be made in the form, construction and arrangement of the parts, and in the steps in the method herein described without departing from the spirit and scope of the invention as defined in the appended claims, and without sacrificing any of its advantages, it is to be understood that all matter herein is to be interpreted as illustrative and not in a limiting sense.

What is claimed is:

1. In the art of making aircraft and the like structures, the method of attaching a thin continuous metallic sheet skin to a metallic frame element which comprises disposing the skin and element in substantially continuous engagement, spot welding the skin and element together at spaced points defining several intervals longitudinally of the element, then bending the element in a direction perpendicular to the surface of the skin and in a direction such as to distend the portion of the element adjacent the skin whereby to tension the skin portions disposed between the regions of welding, and retaining the element in bent condition.

2. In the art of making aircraft and the like structures, the method of producing a reinforced metallic skin blanket having a continuous metallic sheet skin and a metallic stiffening element which consists in bowing the stiffening element to present a concave surface and a convex surface, disposing the skin in substantially continuous engagement with the concave surface, rigidly securing the skin to the stiffening element at spaced points defining several intervals, and thereafter bending the stiffening element from its bowed condition to the final form it is to assume whereby to tension the portions of the skin disposed between the regions of securement, and then fixing said stiffening element in said final form.

3. In the art of making aircraft and the like structures embodying a sheet metal skin covered structure having spaced ribs and supporting elements extending between said ribs, the method of attaching thereto a skin blanket having a thin continuous metallic sheet skin and a plurality of metallic stiffening elements secured thereto by spot welds extending longitudinally of said stiffening elements and defining a multiplicity of skin portions between said welds and which consists in disposing the blanket with its stiffening elements upon the structure with the stiffening elements engaging the supporting elements, exerting pressure in a direction perpendicular to the surface of the skin and from the skin side and toward the supporting elements to bend the stiffening elements and distend the metal thereof adjacent the skin and thereby tension the skin portions lying between the spot welds, and then securing the supporting and stiffening elements in position.

4. In the art of making aircraft and the like structures, the method of producing a structure having a frame element and a thin continuous metal skin sheet secured thereto and substantially covering said frame, which includes the steps of securing the skin sheet in taut condition to one side of a frame element at several spaced points thereon throughout its length, and tensioning the skin sheet between its points of securement to the frame element by bending the frame element between the points of securement by a force in a direction normal to and toward the skin sheet to the final form it is to assume, and then fixing said frame element and skin sheet in said final form.

MICHAEL WATTER.